United States Patent
Lee et al.

(10) Patent No.: US 10,333,912 B2
(45) Date of Patent: Jun. 25, 2019

(54) METHOD FOR INDUCING INSTALLATION OF PRIVATE CERTIFICATE

(71) Applicant: SOOSAN INT CO., LTD., Seoul (KR)

(72) Inventors: Yong Hwan Lee, Seoul (KR); Jun Hyeok Yim, Seoul (KR); Kyoung Tae Kang, Seoul (KR)

(73) Assignee: SOOSAN INT CO., LTD., Seoul (KR)

( * ) Notice: Subject to any disclaimer, the term of this patent is extended or adjusted under 35 U.S.C. 154(b) by 96 days.

(21) Appl. No.: 15/573,094

(22) PCT Filed: May 11, 2016

(86) PCT No.: PCT/KR2016/004919
§ 371 (c)(1),
(2) Date: Nov. 9, 2017

(87) PCT Pub. No.: WO2016/182334
PCT Pub. Date: Nov. 17, 2016

(65) Prior Publication Data
US 2018/0152424 A1    May 31, 2018

(30) Foreign Application Priority Data
May 12, 2015    (KR) ........................ 10-2015-0066316

(51) Int. Cl.
*H04L 29/06*    (2006.01)
*G06F 8/61*    (2018.01)
*H04L 29/12*    (2006.01)

(52) U.S. Cl.
CPC ................ *H04L 63/06* (2013.01); *G06F 8/61* (2013.01); *H04L 61/1511* (2013.01); *H04L 63/0823* (2013.01); *H04L 63/166* (2013.01); *H04L 63/20* (2013.01); *H04L 61/2007* (2013.01)

(58) Field of Classification Search
CPC ...................................................... H04L 63/06
See application file for complete search history.

(56) References Cited

U.S. PATENT DOCUMENTS 7,120,662 B2 *    10/2006   Vange ................... G06F 9/5027
                                                       709/203
7,328,341 B1      2/2008    Eurn et al.
(Continued)

FOREIGN PATENT DOCUMENTS

KR    10-0437225 B1    6/2004
KR    10-0955650 B1    4/2010
(Continued)

OTHER PUBLICATIONS

International Search Report dated Aug. 18, 2016, issued in PCT Application No. PCT/KR2016/004919, filed May 11, 2016.
(Continued)

*Primary Examiner* — Shawnchoy Rahman
(74) *Attorney, Agent, or Firm* — Workman Nydegger (57) ABSTRACT

The present invention relates to a method for inducing the installation of a private certificate, the method setting an installation confirmation parameter as "false", executing a parameter change file stored in a security network server, and connecting a page for installing a private certificate if the installation confirmation parameter is not changed after the execution of the parameter change file fails.

10 Claims, 11 Drawing Sheets

(56) References Cited

U.S. PATENT DOCUMENTS

| | | | |
|---|---|---|---|
| 2005/0166262 A1* | 7/2005 | Beattie | G06F 21/6218 |
| | | | 726/5 |
| 2006/0143700 A1* | 6/2006 | Herrmann | H04L 63/0823 |
| | | | 726/14 |
| 2013/0111435 A1* | 5/2013 | Rudwick, III | G06F 8/4434 |
| | | | 717/108 |
| 2015/0341353 A1* | 11/2015 | Zhou | H04L 63/0823 |
| | | | 713/175 |
| 2017/0180069 A1* | 6/2017 | Leng | H04B 7/2643 |

FOREIGN PATENT DOCUMENTS

| | | |
|---|---|---|
| KR | 10-2011-0007441 A | 1/2011 |
| KR | 10-1189802 B1 | 10/2012 |
| KR | 10-2014-0044987 A | 4/2014 |

OTHER PUBLICATIONS

Written Opinion dated Aug. 18, 2016, issued in PCT Application No. PCT/KR2016/004919, dated May 11, 2016.
*Terminal Authentication Service*, Plustech, Jul. 13, 2014, <URL: https://web.archive.Org/v,'•eb/201407131.557G0/http://\vww.plustech.co.kr/html/service/service 01 .html>.

* cited by examiner

```
Index.htm
<!DOCTYPE HTML PUBLIC "-//W3C//DTD HTML 4.0 Transitional//EN">
<HTML>
<HEAD>
<TITLE>SSL Certificates</TITLE>
</HEAD>

<script>
    var sslCertTrusted = false;   // declare that value of sslCertTrusted in Heap Memory to be false
</script>

// js file below is normally executed when certificate is present and js file is inexecutable when certificate is absent.
<script type="text/javascript" src="https://ewalkeragent.plustech.co.kr/sslCheck.js"></script>

<SCRIPT>
if (!sslCertTrusted)   // sslCertTrusted  true/false check
{
    alert('No..!! certificate');
    window.location.href= certificate installing page
}else{
    alert('OK!!')
    window.location.href=  user request page
}
</SCRIPT>
<BODY>
</BODY>
</HTML>
```

FIG. 8

```
sslCheck.js
sslCertTrusted = true; // change declared value of sslCertTrusted to be false in Heap Memory to be true
```

FIG. 9

```
Index.htm

<!DOCTYPE HTML PUBLIC "-//W3C//DTD HTML 4.0 Transitional//EN">
<HTML>
 <HEAD>
  <TITLE>SSL Certificates</TITLE>
 </HEAD>

<script>
// fetch cookie
function getCookie(cName) {
    cName = cName + '=';
    var cookieData = document.cookie;
    var start = cookieData.indexOf(cName);
    var cValue = '';
    if(start != -1){
        start += cName.length;
        var end = cookieData.indexOf(';', start);
        if(end == -1)end = cookieData.length;
        cValue = cookieData.substring(start, end);
    }
    return unescape(cValue);
}
</script>
<script type="text/javascript" src="https://ewalkeragent.plustech.co.kr/sslCheckCookie.js"></script>
<SCRIPT>
  if (getCookie('ca') == '1')
  {
            alert('OK!!')
     window.location.href= user request page;
  }
  else
  {
        alert('No..!! certificate');
     window.location.href= certificate installing page
  }
</SCRIPT>
<BODY>
</BODY>
</HTML>
```

FIG. 10

```
sslCheckCookie.js
// generate cookie
function setCookie(cName, cValue, cDay){
    var expire = new Date();
    expire.setDate(expire.getDate() + cDay);
    cookies = cName + '=' + escape(cValue) + '; path=/'; // escape(cValue) to prevent broken Hangeul
    if(typeof cDay != 'undefined') cookies += ';expires=' + expire.toGMTString() + ';';
    document.cookie = cookies;
} setCookie('ca','1');
```

FIG. 11

METHOD FOR INDUCING INSTALLATION OF PRIVATE CERTIFICATE

TECHNICAL FIELD

The present invention relates to a technology for preventing an information leakage, and more particularly, to a network security method and a method of inducing an installation of private certificate.

BACKGROUND ART

With the development of information communications, information may be exchanged anytime and anywhere through Internet access. However, there are a number of harmful websites providing unsound information. As a risk of information leakage and hacking increases, an interest in network security is increasing.

Korean Patent Application Publication No. 2014-0044987 discloses a system and method for guiding bypass of Internet access path using domain name system (DNS) packet modulation that may enable smooth communication by preventing an Internet Protocol (IP) address collision. However, a network security system using a proxy server of the above patent application only examines and blocks an incoming packet, but does not block an outgoing packet. Accordingly, technology for providing a security service while maintaining an existing network environment is needed.

Further, there is a need for technology for giving a warning that a page is blocked without an error due to a secure sockets layer (SSL) communication even when a website to be blocked uses the SSL communication.

DISCLOSURE OF INVENTION

Technical Goals

The present disclosure is induced to solve the above-described problem of the related art, and an aspect of the present invention provides a method of inducing an installation of a private certificate.

In more detail, another aspect of the present invention provides a method of inducing an installation of a private certificate and verifying whether the private certificate is installed in a client terminal in order to giving a warning that a page is blocked without an error due to a secure sockets layer (SSL) communication even when a website to be blocked uses the SSL communication.

Further, still another aspect of the present invention provides a method of inducing an installation of a private certificate and verifying whether the private certificate is installed based on whether a file for changing a parameter stored in a security network server is executable.

Also, still another aspect of the present invention provides a method of inducing a private certificate and verifying whether the private certificate is installed based on whether a cookie generation file for generating a cookie stored in a security network server is executable.

Technical Solutions

According to an aspect of the present invention, there is provided a method of inducing an installation of a private certificate including setting an installation verification parameter to be false, executing a parameter change file stored in a security network server, and connecting a page for installing the private certificate in response to the installation verification parameter being not changed due to failure to execute the parameter change file.

The method may further include changing the installation verification parameter to be true based on an instruction stored in the parameter change file in response to the parameter change file being successfully executed.

The parameter change file may be provided in JavaScript.

The parameter change file stored in the security network server may be inexecutable in response to the private certificate of the security network server being absent.

According to another aspect of the present invention, there is provided a method of inducing an execution of a private certificate including executing an instruction to fetch a cookie value of a security network, executing a cookie generation file for generating a cookie stored in a server of the security network, and connecting a page for installing the private certificate in response to the cookie value being absent due to failure to execute the cookie generation file.

The method may further include generating the cookie value of the security network based on an instruction stored in the cookie generation file in response to the cookie generation file being successfully executed.

The method may further include verifying that the private certificate of the security network is installed in response to the cookie generation file being successfully executed.

The cookie generation file may be provided in JavaScript.

The cookie generation file stored in the server of the security network may be inexecutable in response to the private certificate of the server of the security network being absent.

Effect

The present invention may induce an installation of a private certificate and verify whether the private certificate is installed based on whether a file for changing a parameter stored in a security network server is executable, or may provide a convenience for a user of a client terminal to easily install the private certificate by inducing an installation of the private certificate and verifying whether the private certificate is installed based on the whether a cookie generation file for generating a cookie stored in the security network server is executable, and may also give a warning that a page is blocked without an error due to a secure sockets layer (SSL) communication even when a domain to be blocked uses the SSL communication.

BEST MODE FOR CARRYING OUT THE INVENTION

Other aspects and features will be apparent from the following example embodiments, which are illustrated in the accompanying figures.

The example embodiments are described with reference to the accompanying drawings. In the description of example embodiments, detailed description of known related structures or functions will be omitted when it is deemed that such description will cause ambiguous interpretation of the present disclosure.

However, the present disclosure is not limited to or restricted by the example embodiments. Like drawing reference numerals refer to like elements.

Hereinafter, a method of inducing an installation of a private certificate according to an example embodiment is described with reference to FIGS. 1 through 11.

Figure 1:
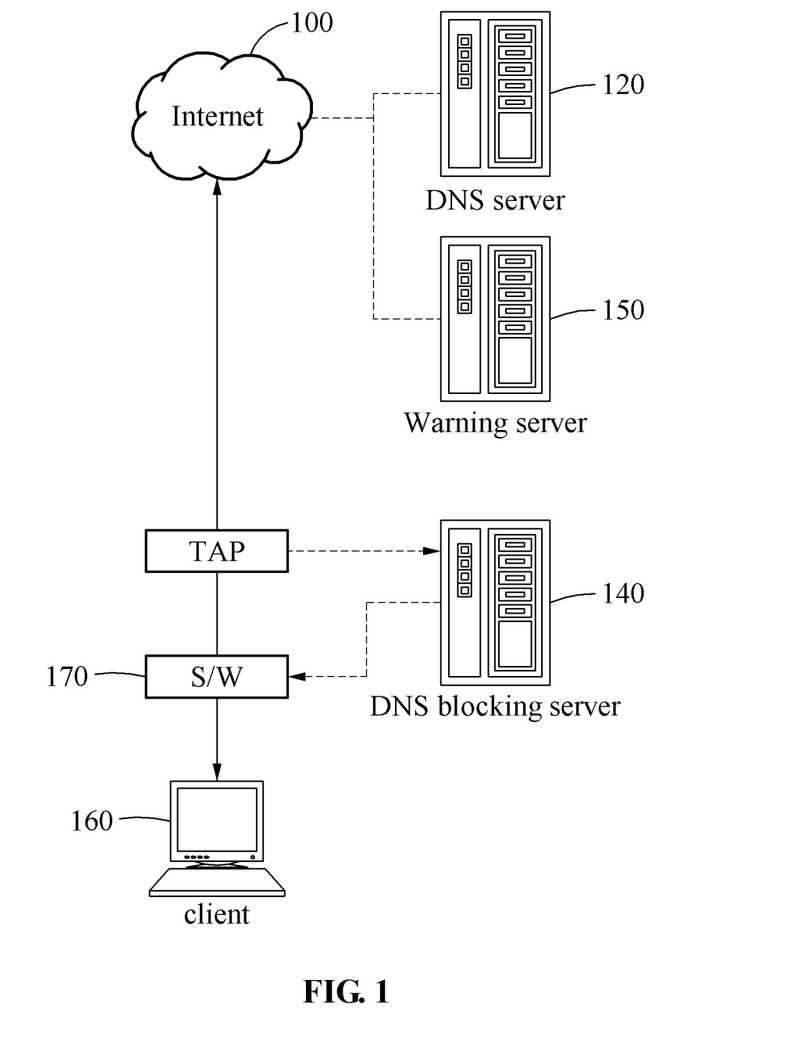
FIG. 1 illustrates a configuration of a network security system according to an example embodiment.

FIG. 1 illustrates a configuration of a network security system according to an example embodiment.

Referring to FIG. 1, when a client terminal 160 accesses the Internet 100 in a network environment, the client terminal 160 may be connected to a switch 170 or a router. The client terminal 160 may be connected to the switch 170 or the router such that a network connection and a data transmission are possible. Here, the client terminal 160 may allow at least one client to access the Internet. For example, a client is a terminal such as a personal computer (PC) and a smartphone.

A domain name system (DNS) blocking server 140 may be connected to a network device to which the client terminal 160 is connected and mirror a DNS query packet that passes through the network device. The DNS blocking server 140 may store a list of management target domain addresses. For example, the DNS blocking server 140 may store management target domain addresses, for example, www.aaa.com, www.bbb.com, and www.ccc.com.

The DNS query packet may be transferred to an outside DNS server 120 through the Internet 100, and transferred to the DNS blocking server 140 through mirroring. The DNS blocking server 140 may extract a DNS query domain address included in the DNS query packet. For example, a DNS query domain address, www.abc.com, included in a DNS query packet may be extracted. Here, whether the DNS query domain address is the management target domain address may be verified. Whether the DNS query domain address is the management target domain address may be verified by comparing the list of the management target domain addresses stored in the DNS blocking server 140 to the DNS query domain address.

In response to the DNS query domain address being not the management target domain address, a www server (not shown) may transfer, to the client terminal 160, a DNS response packet with respect to the DNS query packet transferred to the outside DNS server 120 through the Internet 100. The client terminal 160 may perform communication by accessing a destination website by normally using the DNS response packet. The DNS response packet may be provided by responding to the DNS query packet that requests an Internet Protocol (IP) address corresponding to a domain name, and may include the IP address corresponding to the domain name.

In response to the DNS query domain address of the DNS query packet being the management target domain address, a fake DNS response packet may be generated and transferred to the client terminal 160 through the switch 170. The DNS blocking server 140 may generate the fake DNS response packet by inputting an IP address of a warning server 150 as a response IP address corresponding to the DNS query domain address. The generated DNS response packet may be transmitted to the client terminal 160 through the switch 170. For example, in response to a DNS query domain address, www.abc.com, being the management target domain address, the DNS blocking server 140 may generate the fake DNS response packet by inputting the IP address (for example, 10.10.10.10) of the warning server 150 as the response IP address corresponding to the DNS query domain address, and transmit the generated fake DNS response packet to the client terminal 160.

The client terminal 160 may receive the DNS response packet and may access the warning server 150. In response to a response packet being received from the client terminal 160 generated using the fake DNS response packet, the warning server 150 may transmit, to the client terminal 160, a warning page indicating that a website is blocked.

Meanwhile, in response to a website to be accessed being a website that requests a secure sockets layer (SSL) communication, the client terminal 160 may transmit a certificate request packet that requests a certificate for the SSL communication to the warning server 150 before the response packet that requests an access to the website is transmitted to the warning server 150.

The warning server 150 may generate a private certificate and transmit this to the client terminal 16 in response to a certificate request packet being received from the client terminal 160 before the request packet is received from the client terminal 160. That is, the warning server 150 may support the SSL communication.

Here, the private certificate may be associated with a website to be accessed by the client terminal 160. The warning server 150 may generate the private certificate using the DNS query domain address to be accessed by the client terminal 160 as a factor.

The warning server 150 may generate the private certificate using the DNS query domain address as the factor using an OpenSSL.

In response to the private certificate being received, the client terminal 160 may verify and authenticate whether the private certificate is reliable. In response to the authentication being successful, an authentication request packet for requesting an access to the website may be transmitted to the warning server 150.

Meanwhile, to authenticate that private certificate generated from the warning server 150 is legitimate, the client terminal 160 may set, in advance, information on the warning server 150 as a root authentication authority. Alternatively, the client terminal 160 may manage the private certificate generated in advance by the warning server 150 to be included in a root certificate.

Figure 2:
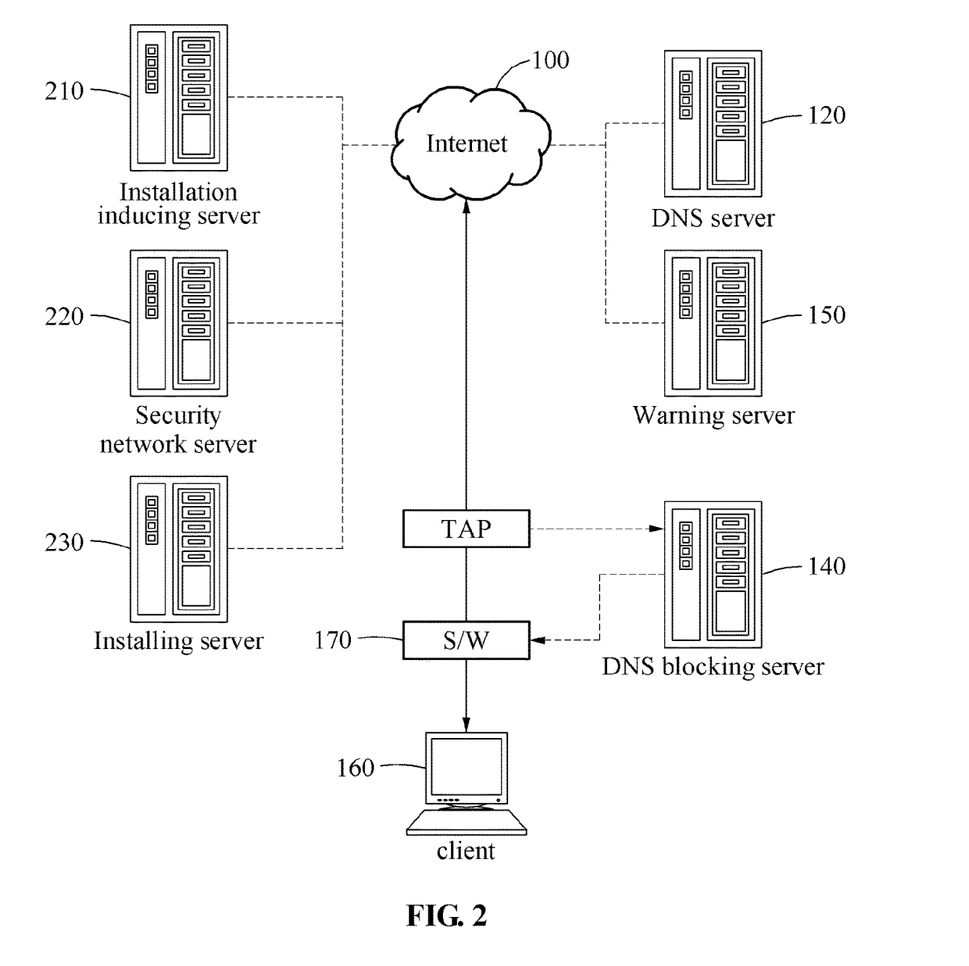
FIG. 2 illustrates a configuration of a network security system for inducing an installation of a private certificate according to an example embodiment.
Figure 3:
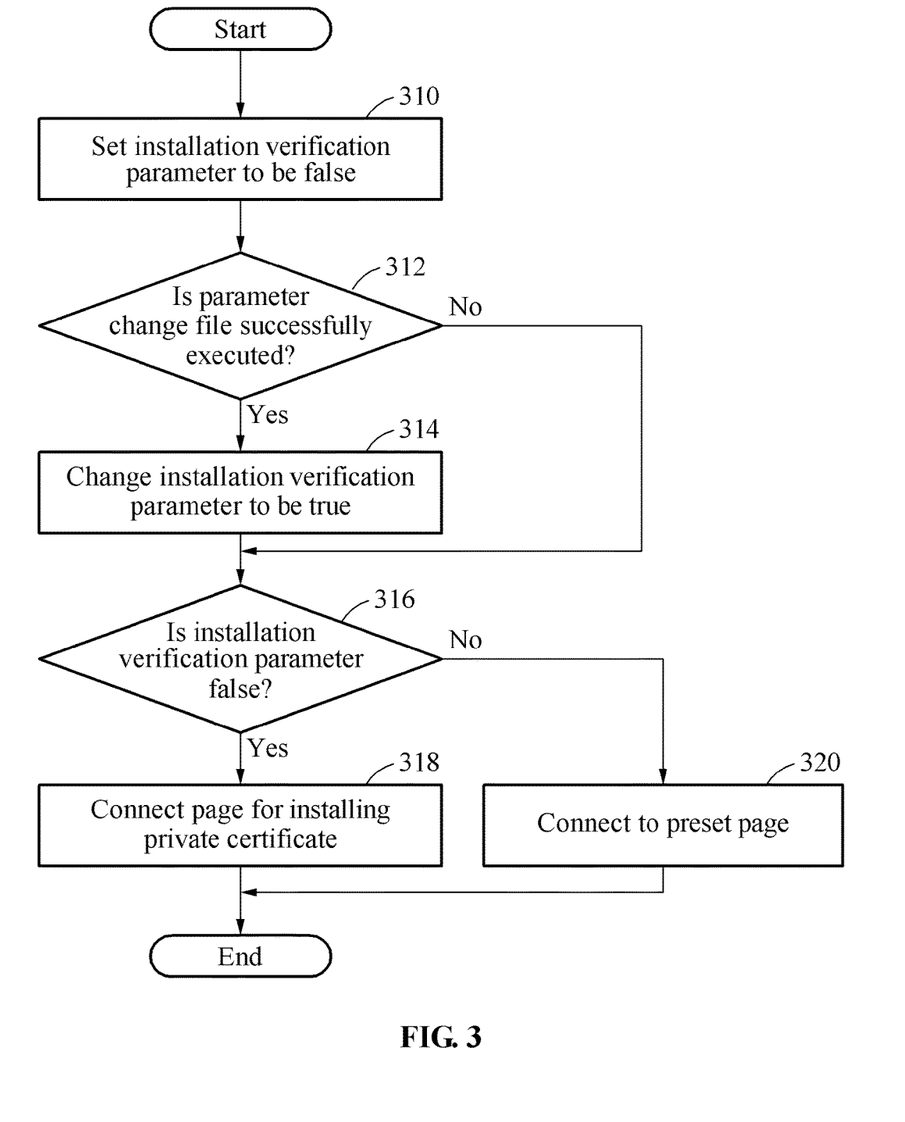
FIG. 3 is a flowchart illustrating a process of inducing an installation of a private certificate by changing a parameter according to an example embodiment.
Figure 4:
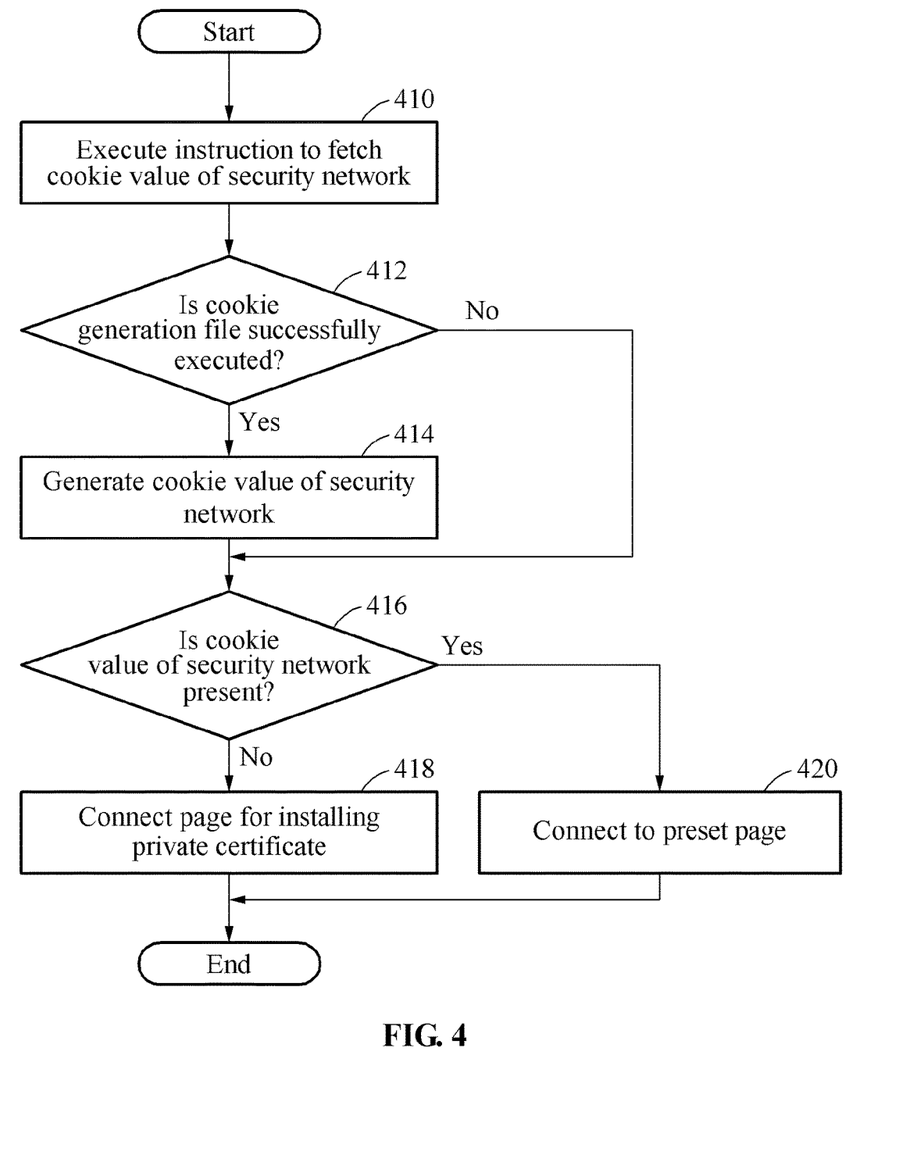
FIG. 4 is a flowchart illustrating a process of inducing an installation of a private certificate by generating a cookie value according to an example embodiment.

Detailed description of a method of setting the private certificate will be provided with reference to FIGS. 2 through 4.

In the related art, a normal network connection may be unavailable when a network security system malfunctions. In a network security system according to an example embodiment, a problem of suspending a service does not occur because the network communication is continuously performed even when a DNS blocking server malfunctions. For example, mirroring is performed even when the DNS blocking server malfunctions and a DNS response packet is transmitted from a normal DNS server to a client terminal such that the client terminal is normally connected to a network using the DNS response packet.

FIG. 2 illustrates a configuration of a network security system for inducing an installation of a private certificate according to an example embodiment.

Referring to FIG. 2, the network security system further includes an installation inducing server 210, a security network server 220, and an installing server 230 for the installation of the private certificate.

The installation inducing server 210 may verify whether the private certificate is installed based on whether a parameter change file for changing a parameter stored in the security network server 220 is executable, and provide the client terminal 160 with an installation inducing page for inducing the installation of the private certificate.

Detailed description of the installation inducing page for changing the parameter will be provided with reference to FIG. 3.

The security network server 220 may perform secure sockets layer (SSL) communication, and the private certificate is needed for an access.

The security network server 220 may store the parameter change file provided in JavaScript. The parameter change file may change a parameter indicating whether the private certificate included in a page for inducing the installation of the private certificate is present.

The installing server 230 may provide the client terminal 160 with a process of installing the private certificate when the client terminal 160 in which the private certificate is not installed using the installation inducing page is accessed.

Meanwhile, the installation inducing server 210 and the security network server 220 may verify whether the private certificate is installed using a cookie value of a security network other than a parameter.

The installation inducing server 210 may verify whether the private certificate is installed based on whether a cookie generation file for generating a cookie stored in the security network server 220 is executable, and provide the client terminal 160 with the installation inducing page for inducing the installation of the private certificate.

Detailed description of the installation inducing page using the cookie value will be provided with reference to FIG. 4.

When the cookie value is used, the security network server 220 may store a cookie generation change file provided in JavaScript. The cookie generation change file may be used to verify whether the private certificate included in the page for inducing the installation of the private certificate is present based on whether the cookie value is present.

Meanwhile, the installation inducing server 210, the security network server 220, and the installing server 230 may be provided in a single server, and the installation inducing server 210 may use an HTTP port of "80" or "8080" and the security network server 220 may use an HTTPS port of "443."

Hereinafter, detailed description of a method of inducing the installation of the private certificate and a method of representing a blocked website in the network security system will be provided with reference to the following drawings.

FIG. 3 is a flowchart illustrating a process of inducing an installation of a private certificate by changing a parameter according to an example embodiment. Description about FIG. 3 is provided with reference to FIGS. 8 and 9.

Referring to FIG. 3, in operation 310, a method of inducing an installation corresponding to an installation inducing page stored in the installation inducing server 210 sets an installation verification parameter to be false.

In operation 312, the method of inducing the installation verifies whether a parameter change file is successfully executed by executing the parameter change file for changing the installation verification parameter stored in a security network server.

Based on a verification that the parameter change file is executable in operation 312, the method of inducing installation changes the installation verification parameter to be true in response to the parameter change file being executed in operation 314.

In operation 316, the method of inducing the installation verifies whether the installation verification parameter is false.

Based on a verification that the installation verification parameter is false in operation 316, the method of inducing the installation connects a page for installing a private certificate.

Based on the verification that the installation verification parameter is true in operation 316, the method of inducing the installation connects a preset page. Here, the preset page may be a page to be accessed by the client terminal 160 or a website of the client terminal 160.

Figure 8:
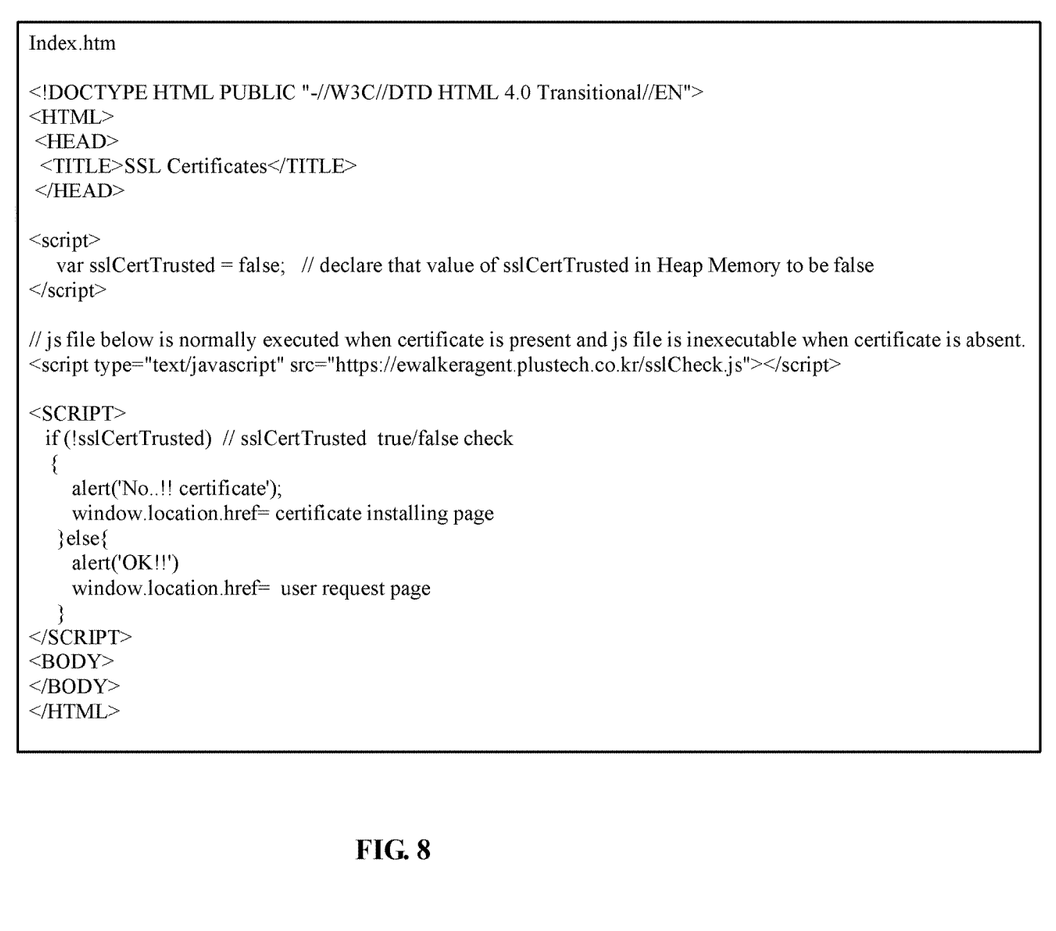
FIG. 8 illustrates an example of an installation inducing page using a parameter stored in an installation inducing server of a network security system according to an example embodiment.

FIG. 8 illustrates an example of an installation inducing page using a parameter stored in an installation inducing server of a network security system according to an example embodiment.

Referring to FIG. 8, "sslCertTrusted" of FIG. 8 corresponds to an installation verification parameter for verifying whether a private certificate is installed described with reference to FIG. 3, "sslCheck.js" corresponds to a parameter change file for changing a parameter, and "https://ewalkeragent.plustech.co.kr" corresponds to a domain address of a security network server.

Figure 9:
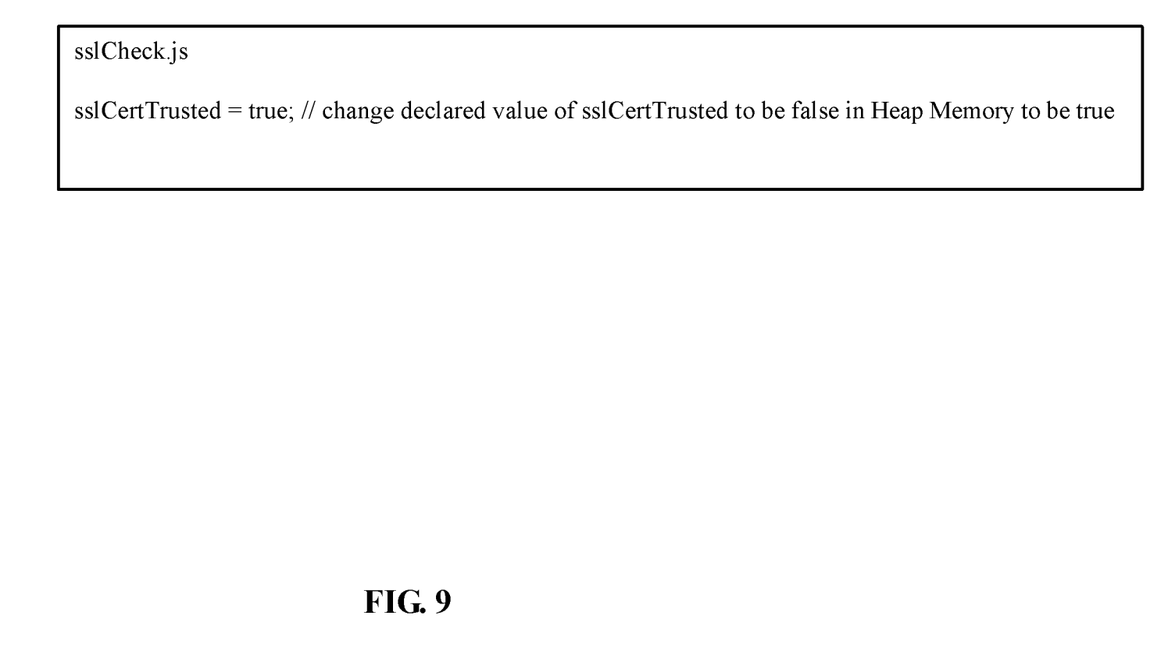
FIG. 9 illustrates an example of a parameter change file stored in a security network server of a network security system according to an example embodiment.

FIG. 9 illustrates an example of a parameter change file stored in a security network server of a network security system according to an example embodiment.

Referring to FIG. 9, a value of "sslCertTrusted" corresponding to an installation verification parameter for verifying whether a private certificate is installed is changed to be "true".

FIG. 4 is a flowchart illustrating a process of inducing an installation of a private certificate by generating a cookie value according to an example embodiment. Description about FIG. 4 is provided with reference to FIGS. 10 and 11.

Referring to FIG. 4, in operation 410, a method of inducing an installation corresponding to an installation inducing page stored in the installation inducing server 210 executes an instruction to fetch a cookie value of a security network.

In operation 412, the method of inducing the installation verifies whether a cookie generation file is successfully executed by executing the cookie generation file for generating the cookie value of the security network stored in a security network server.

Based on a verification that the cookie generation file is executable in operation 412, the method of inducing the installation generates the cookie value of the security network in response to the cookie generation file being executed in operation 414.

In operation 416, the method of inducing the installation verifies whether the cookie value of the security network is present.

Based on a verification that the cookie value of the security network is absent in operation 416, the method of inducing the installation connects a page for installing the private certificate.

Based on the verification that the cookie value of the security network is present in operation 416, the method of inducing the installation connects a preset page. Here, the preset page may be a page to be accessed by the client terminal 160 or a website of the client terminal 160.

Figure 10:
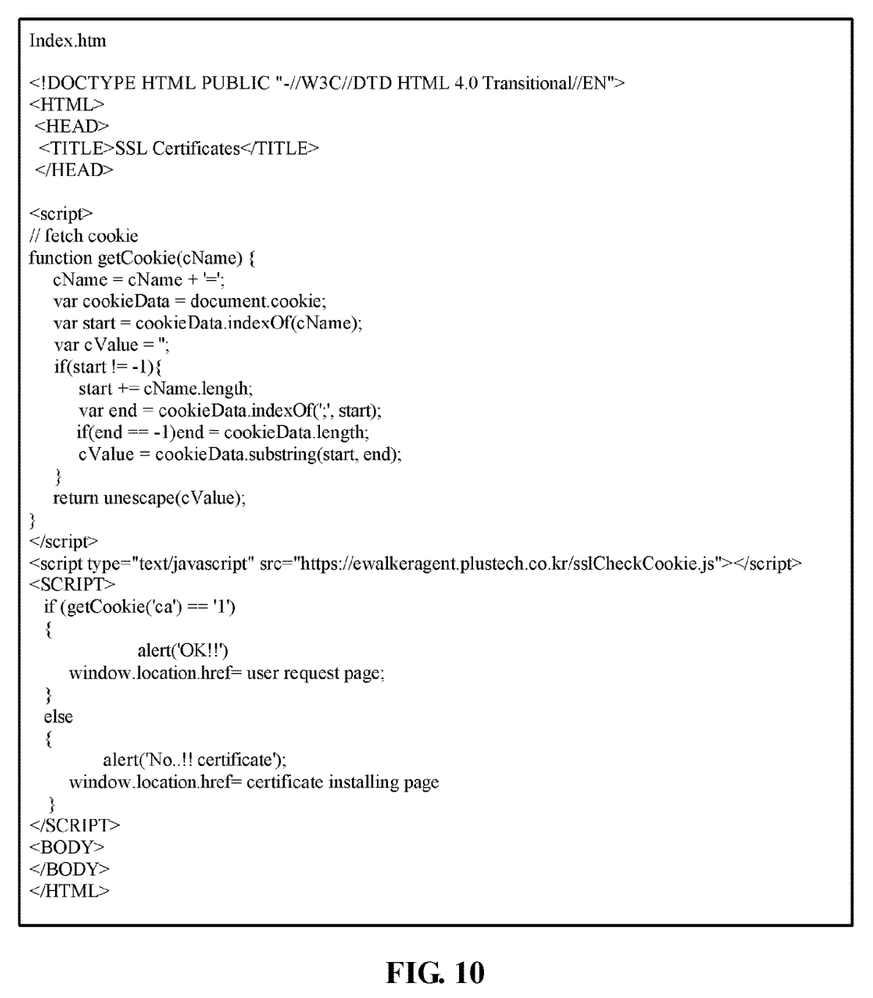
FIG. 10 illustrates an example of an installation inducing page using a cookie value stored in an installation inducing server of a network security system according to an example embodiment.

FIG. 10 illustrates an example of an installation inducing page using a cookie value stored in an installation inducing server of a network security system according to an example embodiment.

Referring to FIG. 10, "getCookie" of FIG. 10 corresponds to an instruction to fetch a cookie value of a security network server described with reference to FIG. 4, "sslCheckCookie.js" corresponds to a cookie generation file for generating the cookie value of the security network server, and "https://ewalkeragent.plustech.co.kr" corresponds to a domain address of the security network server.

Figure 11:
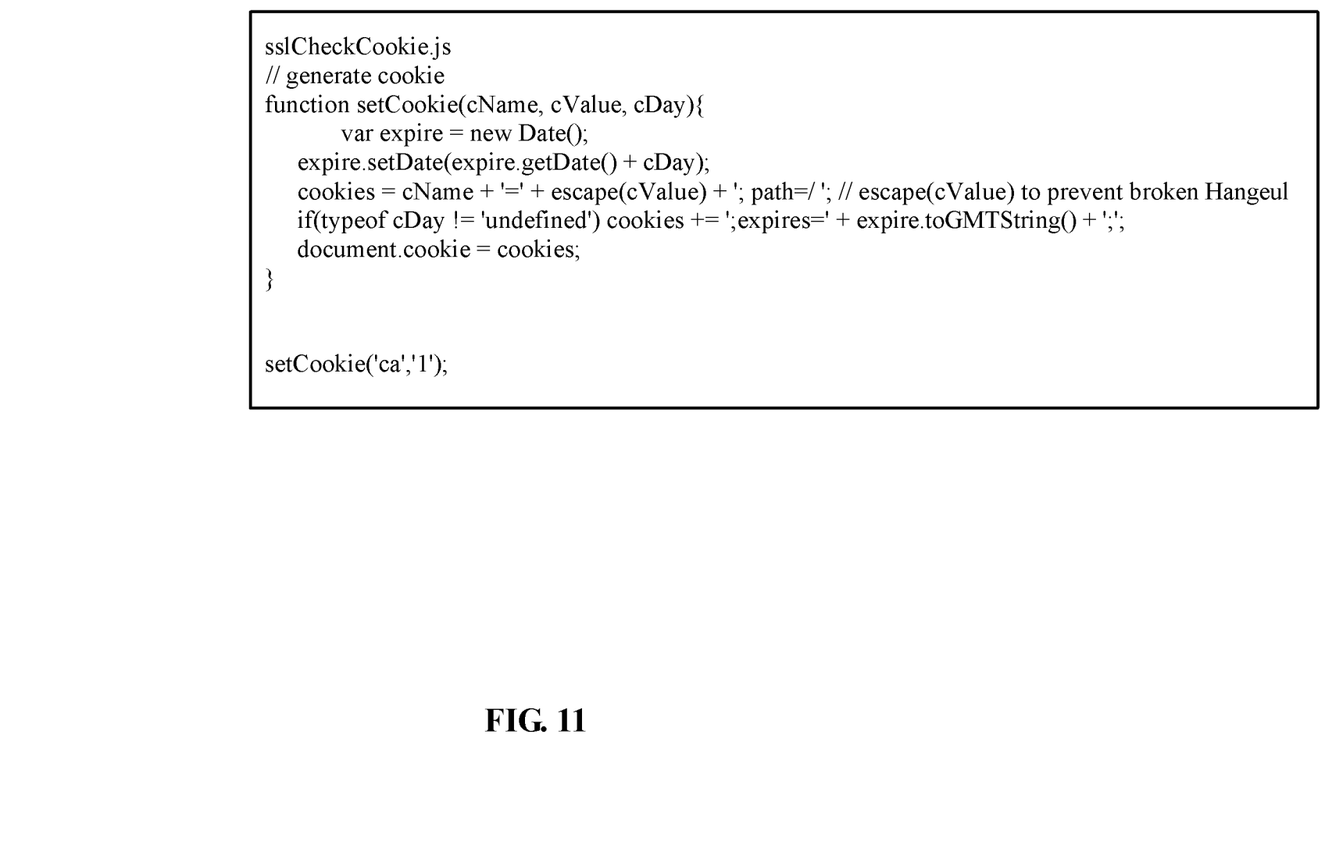
FIG. 11 illustrates an example of a cookie generation file stored in a security network server of a network security system according to an example embodiment.

FIG. 11 illustrates an example of a cookie generation file stored in a security network server of a network security system according to an example embodiment.

Referring to FIG. 11, a cookie value of a security network server for verifying whether a private certificate is installed may be generated through a "setCookie" instruction.

Figure 5:
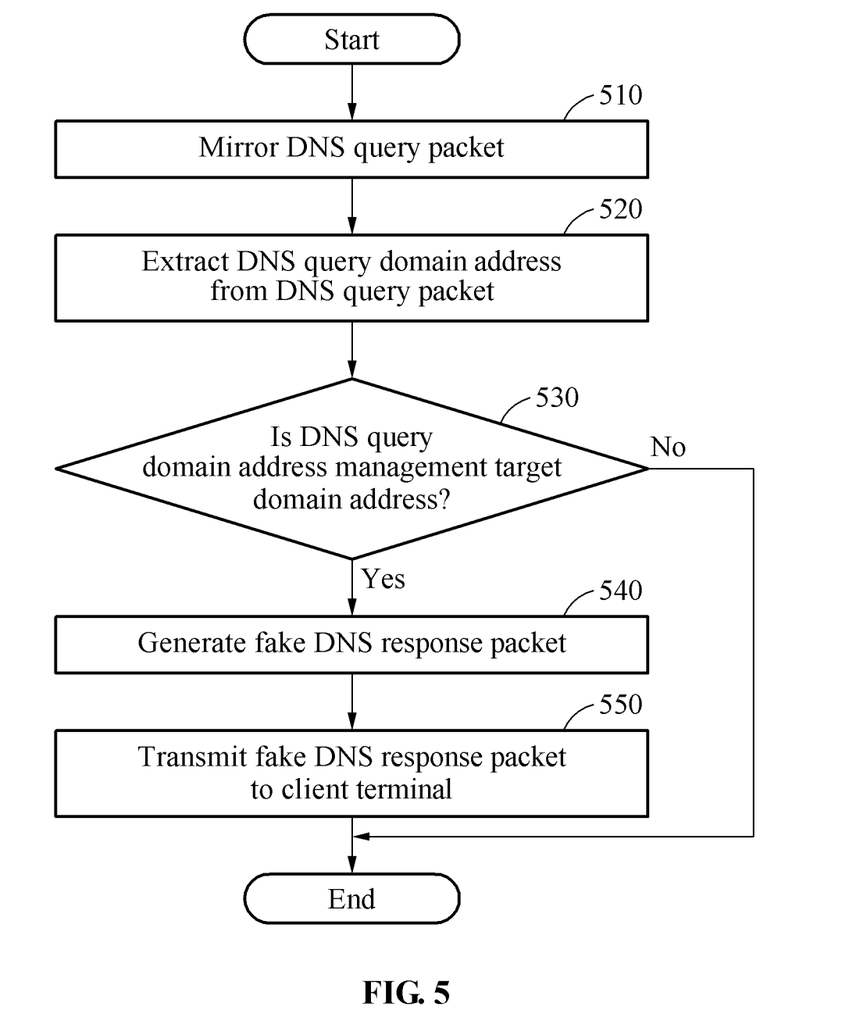
FIG. 5 is a flowchart illustrating a process of processing a domain name system (DNS) query packet in a DNS blocking server of a network security system according to an example embodiment.

FIG. 5 is a flowchart illustrating a process of processing a domain name system (DNS) query packet in a DNS blocking server of a network security system according to an example embodiment.

Referring to FIG. 5, in operation 510, the DNS blocking server 140 mirrors the DNS query packet that passes through a network device to which the client terminal 160 is connected.

In operation 520, the DNS blocking server 140 extracts a DNS query domain address from the DNS query packet.

In operation 530, the DNS blocking server 140 verifies whether the DNS query domain address is a management target domain address.

Based on a verification that the DNS query domain address is the management target domain address in operation 530, the DNS blocking server 140 generates a fake DNS response packet in operation 540.

In addition, the DNS blocking server 140 transmits the generated fake DNS response packet to the client terminal 160 in operation 550.

Figure 6:
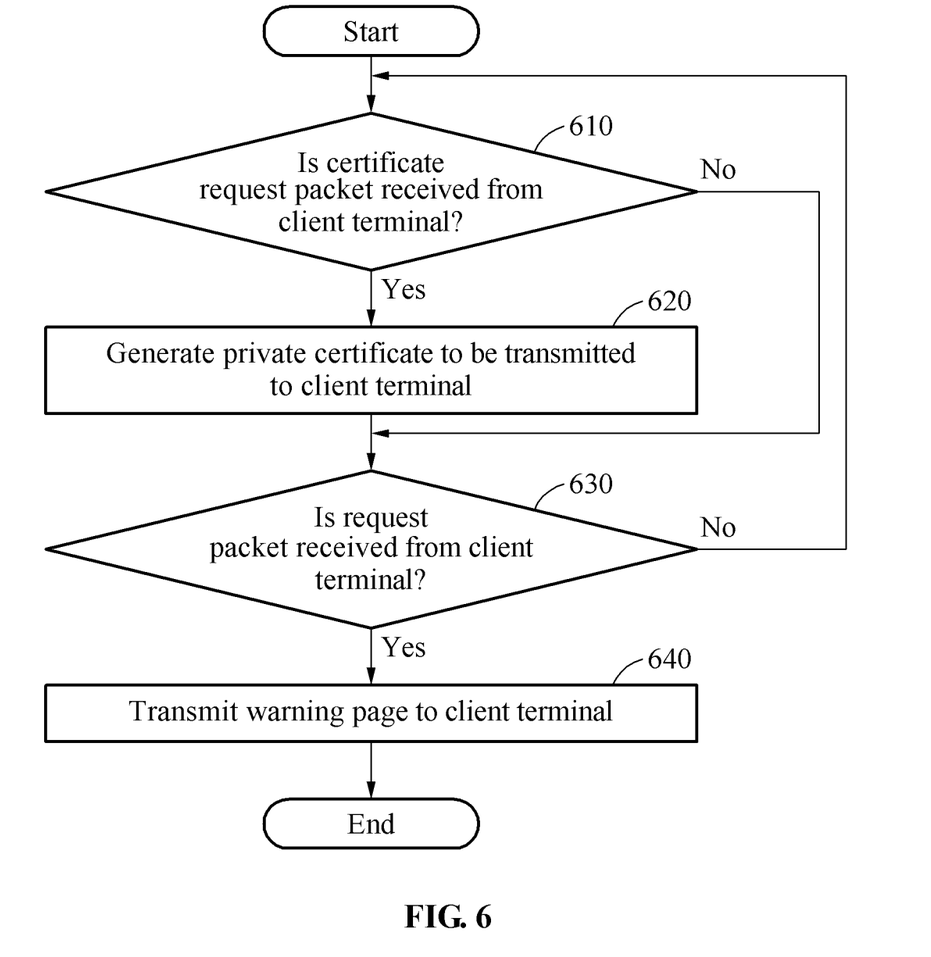
FIG. 6 is a flowchart illustrating a process of giving a warning that a page is blocked in response to a request of an access to a management target in a warning server in a network security system according to an example embodiment.

FIG. 6 is a flowchart illustrating a process of giving a warning that a page is blocked in response to a request of an access to a management target in a warning server in a network security system according to an example embodiment.

Referring to FIG. 6, in operation 610, the warning server 150 verifies whether a certificate request packet is received from the client terminal 160.

Based on a verification that the certificate request packet is received in operation 610, the warning server 150 generates a private certificate to be transmitted to the client terminal 160 in operation 620. Here, the private certificate is a certificate corresponding to a website to be accessed by the client terminal 160, and is generated using a DNS query domain address to be accessed by the client terminal 160 as a factor.

In addition, the warning server 150 verifies whether a request packet for making a request of an access of a website is received from the client terminal 160 that receives the fake DNS response packet in operation 630.

Based on a verification that the request packet is received in operation 630, the warning server 150 transmits a warning page indicating that a website is blocked to the client terminal 160 in operation 640.

Figure 7:
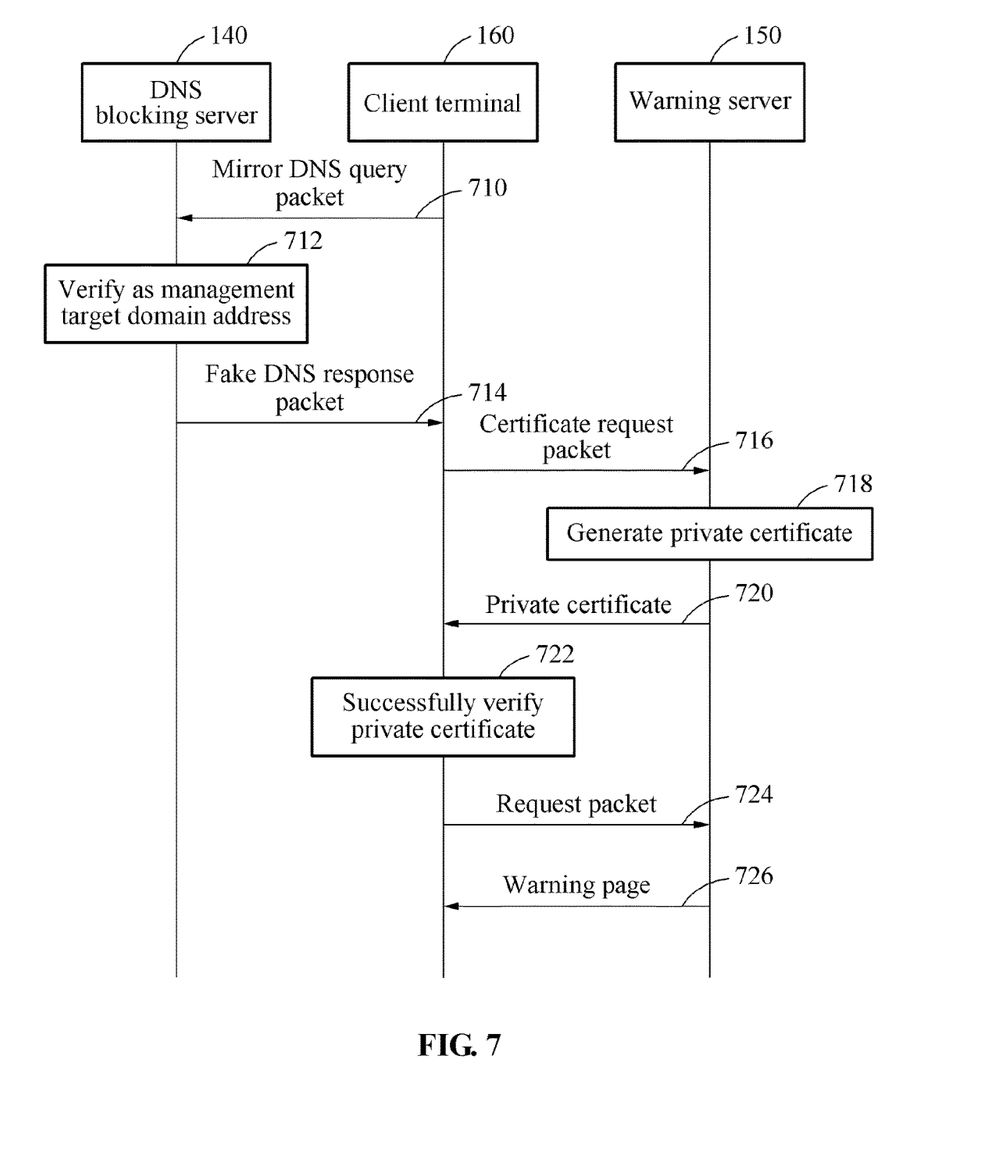
FIG. 7 illustrates a process in which a client terminal makes a request of an access to a web site of a management target that requires a secure sockets layer (SSL) communication according to an example embodiment.

FIG. 7 illustrates a process in which a client terminal makes a request of an access to a web site of a management target that requires a secure sockets layer (SSL) communication according to an example embodiment.

Referring to FIG. 7, in operation 710, the DNS blocking server 140 mirrors a DNS query packet that passes through a network device to which the client terminal 160 is connected.

Based on a verification that a DNS query domain address is a management target domain address by extracting the DNS query domain address from a DNS query packet in operation 712, the DNS blocking server 140 generates a fake DNS response packet to be transmitted to the client terminal 160 in operation 714. Here, a response IP address of the fake DNS response packet includes an IP address of the warning server 150.

In response to a website to be accessed by the client terminal 160 being a website requesting an SSL communication, a certificate request packet is transmitted to the warning server 150 when the fake DNS response packet is received in operation 716.

When the warning server 150 receives the certificate request packet from the client terminal 160, the private certificate is generated in operation 718. Here, the private certificate is a certificate corresponding to a website to be accessed by the client terminal 160, and is generated using a DNS query domain address to be accessed by the client terminal 160 as a factor.

In addition, the private certificate generated by the warning server 150 is transmitted to the client terminal 160 in operation 720.

When the client terminal 160 receives the private certificate from the warning server 150, whether the private certificate is legitimate is verified. When the verification succeeds in operation 722, a request packet for requesting an access to the website is transmitted to the warning server 150 in operation 724.

When the warning server 150 receives the request packet from the client terminal 160, a warning page for indicating that the website is blocked is transmitted to the client terminal 160 in operation 726.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of inducing an installation of a private certificate, the method comprising:
    setting an installation verification parameter to be false;
    executing a parameter change file stored in a security network server; and
    connecting a page for installing the private certificate in response to the installation verification parameter being not changed due to failure to execute the parameter change file.

2. The method of claim 1, further comprising:
    changing the installation verification parameter to be true based on an instruction stored in the parameter change file in response to the parameter change file being successfully executed.

3. The method of claim 1, wherein the parameter change file is provided in JavaScript.

4. The method of claim 1, wherein the parameter change file stored in the security network server is inexecutable in response to the private certificate of the security network server being absent.

5. A method of inducing an execution of a private certificate, the method comprising:
    executing an instruction to fetch a cookie value of a security network;
    executing a cookie generation file for generating a cookie stored in a server of the security network; and
    connecting a page for installing the private certificate in response to the cookie value being absent due to failure to execute the cookie generation file.

6. The method of claim 5, further comprising:
    generating the cookie value of the security network based on an instruction stored in the cookie generation file in response to the cookie generation file being successfully executed.

7. The method of claim 5, further comprising:
    verifying that the private certificate of the security network is installed in response to the cookie generation file being successfully executed.

8. The method of claim 5, wherein the cookie generation file is provided in JavaScript.

9. The method of claim 5, wherein the cookie generation file stored in the server of the security network is inexecutable in response to the private certificate of the server of the security network being absent.

10. A non-transitory computer-readable storage medium storing a program for causing a processor to perform any one method of claim 1.

* * * * *